United States Patent [19]

Arruda

[11] Patent Number: 4,697,670
[45] Date of Patent: Oct. 6, 1987

[54] WASTE OIL COLLECTION DEVICE

[76] Inventor: Michael Arruda, 79 Acushnet Rd., Mattapoisett, Mass. 02739

[21] Appl. No.: 823,189

[22] Filed: Jan. 27, 1986

[51] Int. Cl.⁴ .................. F16C 3/14; F16N 33/00; F16N 31/00; B65B 1/01
[52] U.S. Cl. .................. 184/1.5; 184/106; 141/340; 141/378; 141/86; 403/330; 248/132; 220/1 C; 220/8
[58] Field of Search .......... 184/1.5, 106; 220/1 C, 220/4 R, 8; 141/98, 339, 88, 86, 331, 340, 378; 312/228; 285/302, 303; 403/106, 108, 327, 330; 222/173, 174, 185; 248/132, 149

[56] References Cited

U.S. PATENT DOCUMENTS

| | | | |
|---|---|---|---|
| 1,951,498 | 3/1934 | Whitney | 184/1.5 |
| 1,994,844 | 3/1935 | Winger | 184/1.5 |
| 1,994,980 | 3/1935 | Cook | 403/108 |
| 2,497,319 | 2/1950 | Mott | 403/108 |
| 2,535,955 | 12/1950 | Raisch | 184/1.5 |
| 2,693,974 | 11/1954 | Taylor | 285/303 |
| 3,323,826 | 6/1967 | Crowley | 403/108 |
| 3,661,189 | 5/1972 | Bowser | 141/378 |
| 3,703,956 | 11/1972 | Oswalt | 184/1.5 |
| 3,907,009 | 9/1975 | Dobbins | 141/378 |
| 4,098,398 | 7/1978 | Meyers | 184/1.5 |
| 4,114,660 | 9/1978 | Arruda | 184/106 |
| 4,235,264 | 11/1980 | Rau | 184/106 |
| 4,527,707 | 7/1985 | Heymann | 220/1C |

*Primary Examiner*—Leonard E. Smith
*Assistant Examiner*—Jane E. Obee
*Attorney, Agent, or Firm*—Robert J. Doherty

[57] ABSTRACT

A device for the collection of waste oil and other liquids including a closeable receptacle and a support. The receptacle is positioned for vertical height adjustment with respect to the support by means of a downwardly extending open-ended boss in telescopic receipt of a post upwardly extending from the support. Stop means are included on the boss such that the positioning of the receptacle may be achieved by one hand of the user while leaving the user free with his or her other hand. Such above action is additionally facilitated by an inwardly extending recess in the side walls of the support.

8 Claims, 3 Drawing Figures

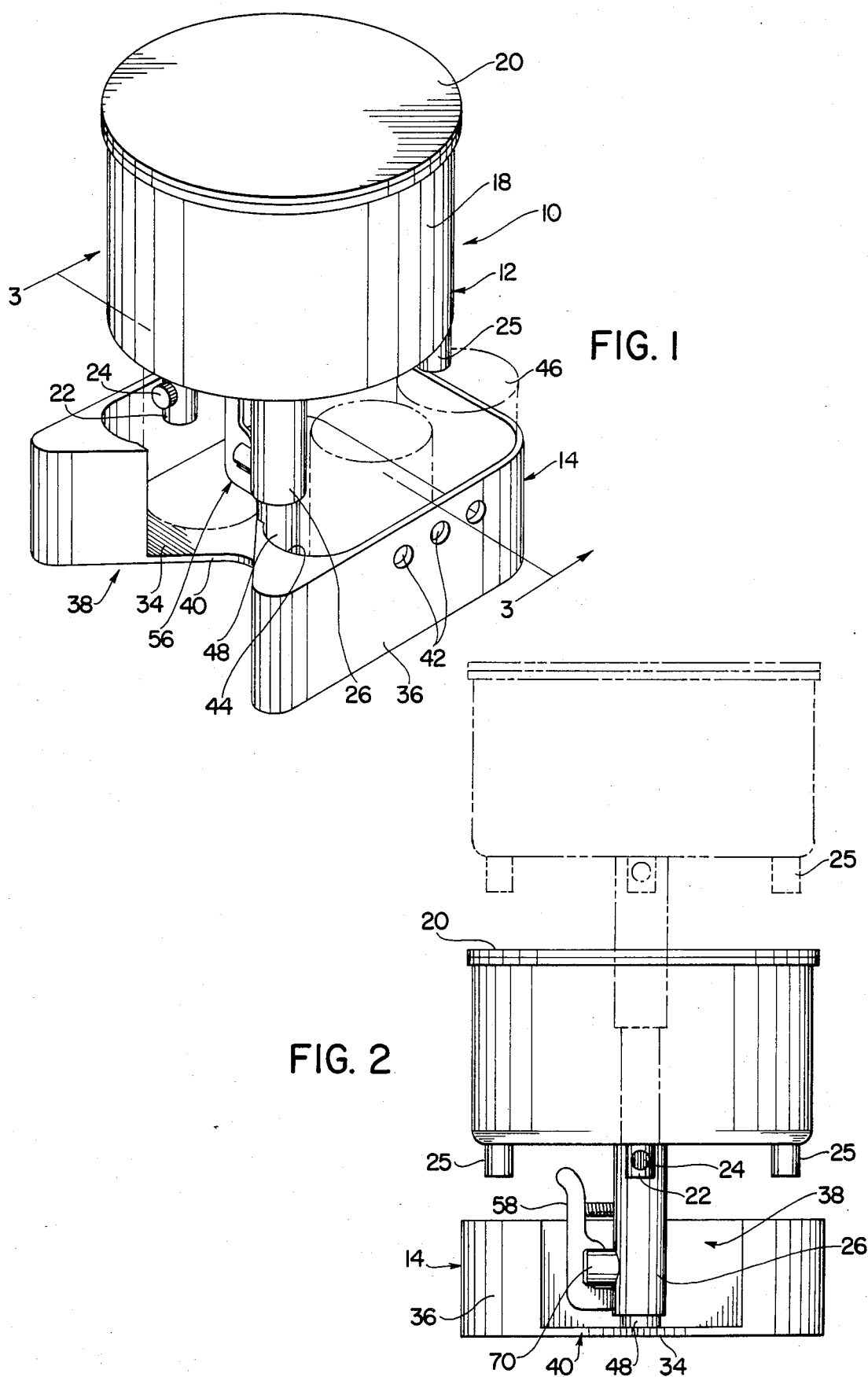

WASTE OIL COLLECTION DEVICE

BACKGROUND AND OBJECTS OF THE INVENTION

This invention relates to a device for collecting and temporarily storing waste products from automobiles and other vehicles. As such this invention deals with a recurrent modern problem relating to the disposal of waste oil. Individual automobile owners are increasingly changing their own oil which is increasingly being brought to collection sites where it is disposed of properly either at the municipal level or by its use as a fuel at gas stations and other collection sites in appropriate combustion devices. This recovery process thus not only involves removing the oil from the vehicle crankcases but also in many cases transferring to an appropriate container for transport to a receiving site. Generally the procedure involved includes the placement of a container beneath the crankcase of the automobile, thereafter opening the crankcase closure plug to permit oil to drain into the container which is then either used to directly dispose of the waste oil or from which the oil is thereafter directed to a subsequent container for later disposal. This can be a messy task and particularly such if there is inadequate room beneath the vehicle in which to work which is often the case and when performing these procedures in inclement, i.e., windy, weather. Often wind can direct the flow of the oil from the vehicle crankcase outisde the opening of the container especially if an extensive distance between the open end of the container and the crankcase drain plug exists. This also may be the case when transferring the oil from the container to a secondary container for subsequent transport.

The present invention provides a device which solves the above-indicated problems in a simple and straightforward manner and which utilizes components which can be produced at a modest cost. As such the present invention is an improvement over applicant's previous automobile oil changing device as set forth in U.S. Pat. No. 4,114,660 issued Sept. 19, 1978.

The above and other objects of the invention are accomplished by a waste oil collection device comprising a receptacle having a bottom wall, upstanding side walls and a top opening, said receptacle further including a detachable cover positioned over and adapted to close said top opening, said receptacle removably positioned on a support, said support having a generally planar base, upstanding side walls and an upstanding centrally positioned post, said receptacle bottom wall including a downwardly extending boss, said boss and said post positioned in slidable telescoping relationship with each other such that the receptacle may be vertically adjusted up and down relative to said support so as to position said receptacle top opening proximal to the drain opening of a vehicle or the like, stop means for maintaining the position of said receptacle relative to said support, said stop means operatively associated with said support such that one hand of the user may simultaneously grasp said boss and manipulate said stop means so as to position and/or remove said receptacle from said support, said support side walls including an inwardly extending recess terminating proximal to said post to facilitate easily reaching said boss by said user.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a front top perspective view showing the device of the present invention;

FIG. 2 is a front elevational view thereof showing the manner in which the receptacle portion of the device may be slidably vertically extended as for placement directly beneath the drain opening of an automobile crankcase.

DESCRIPTION OF THE INVENTION

Figure 3:
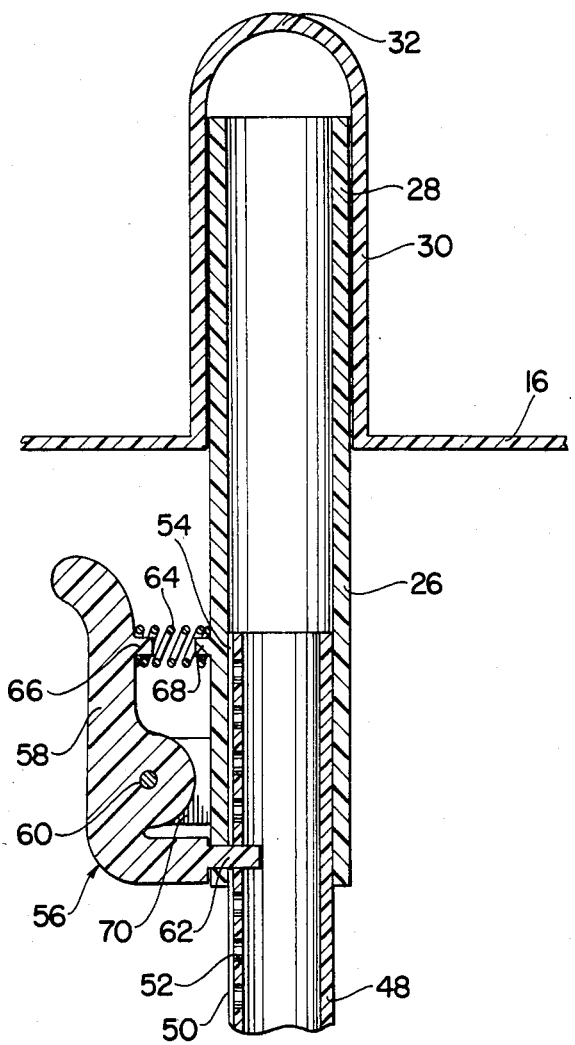
FIG. 3 is partial sectional view on an enlarged scale taken along the line 3—3 of FIG. 1.

The overall construction of the waste oil collection device 10 of the present invention is best shown in FIG. 1 of the drawings wherein reference numeral 12 indicates a closed receptacle which is positioned relative to a support 14 such that the receptacle may be adjustably moved vertically up and down with respect thereto. The receptacle includes a bottom wall 16, upstanding side walls 18, and a detachable cover 20 positioned in sealing relationship to the upper terminal edge of the side walls such that the cover forms a sealing relationship therewith such that waste oil or other fluids collected therein may be temporarily stored without danger of spillage. The cover 20 is easily removable from the receptacle 12 such that is presents an open top which can be presented proximal to the drain opening of an automobile or other vehicle, machinery, or the like.

The bottom wall 16 of the receptacle 12 is provided with a drain opening aligned with a drainage spout 22 having a valve manipulated by a handle 24. In this way oil temporarily stored in the receptacle 12 can be purposefully drained into a secondary container as will hereinafter be more fully explained. The bottom wall 16 is further provided with a central opening through which a hollow boss 26 extends and downwardly projects therefrom. A pair of legs 25 also extend downwardly from wall 16 and terminate generally even with the bottom of the spout 22 such that the receptacle can be positioned on a flat surface with stability (assuming the surface has a central opening to accommodate the boss 26). The boss includes an upper extension 28 which in turn is adapted to extend into an upstanding tunnel 30 having a rounded end 32 such that oil within the receptacle will not collect thereon and preferably drain easily therefrom. The boss extension 28 may be attached to the inside of the tunnel 30 as by gluing, threading, and the like or may merely be received therein frictionally and thus enable the receptacle 12 to be removed from the boss if desired. The boss 26, 28 thus forms a part of the means by which the receptacle 12 may be positioned in various vertical attitudes with respect to the support 14.

The support 14 includes a generally planar base wall 34 from which side walls 36 upwardly extend from the periphery thereof. The overall configuration of the support 14 is rectangular with a large triangularly-shaped recess 38 inwardly extending from one of the sides thereof. A portion of the forward side wall is either entirely removed or of a much lower height extent proximal the apex 40 of the recess 38 for a purpose which will hereinafter more fully apparent. Opposed side walls 36 may also be provided with convenient finger openings 42 and thus form a convenient means whereby the entire assembly 10 may be transported. The portion of the side walls 36 which are disposed on either side of the recess 38 may be reinforced and preferably inwardly terminate in a partially circular inner wall 44 such that oil containers 46 shown in phantom may be conveniently snugly engaged therewith such the base and cooperating side walls 34, 36 conveniently form a storage facility for a number of oil containers.

A post 48 upwardly extends from a central portion of the support base wall 34 at a position proximal to the apex 40 of the recess 38. The post is of hollow construction and is attached at its base to the base wall 34 by any convenient means such as glue, heat welding, or threaded connection. It should be pointed out at this time that the receptacle and support as well as the various components thereof may be conveniently formed from various plastic materials such as polyethylene suited for their respective purposes with respect to rigidity, durability, and the like.

One side of the post 48 is provided with a vertically oriented slot 50 having a plurality of openings 52 extending therethrough. A vertically extending ridge 54 on the boss 26 inwardly extends from the inner surface thereof and cooperates with the slot 50 so as to key the post and boss together in vertical slidable relationship. In order to fix the various positions which the receptacle 12 may assume vis-a-vis the support 14 stop means 56 is provided. Such stop means may take the form as shown of a handle 58 pivotally supported at its center by a pivot pin 60. The handle includes a detent 62 at its lower portion and is adapted to extend into one of the openings 52 so as to position the boss 26 with respect to the post 48 in the intended manner. A spring 64 is positioned between an extension 66 on the upper portion of the handle and an extension 68 outwardly extending from the surface of the boss 26 which spring 64 normally biases the handle in the closed locked position as shown in FIG. 3. It should be apparent that by squeezing the upper portion of the handle 58 that the detent 62 will be released from which ever opening 52 it is positioned in and thereby enable the boss and the receptacle 12 attached thereto to assume a different position in vertical relationship to the support 14 or be entirely removed from the post 48. A bifurcated extension 70 through which the pivot pin 60 extends serves to mount the handle 58 on the outside of the boss 26.

Operation of the device is as follows: The support 14 with the receptacle positioned in a low position such as shown by the solid lines in FIG. 2 is placed beneath the drain opening of an automobile, piece of machinery or the like. The user may then grasp the handle 58 by extending an arm into the recess to grasp the same and, accordingly, manipulate the receptacle to an upper position as shown by the dotted lines in FIG. 2. This upper position reduces the length of the stream of fluid draining from the crankcase which is exposed to the action of wind and otherwise prevents excessive dripping or splashback. It should also be pointed out that the manipulation, control, and positioning of the receptacle is by one-handed action with respect to the handle 58 and this, accordingly, leaves the user with the other hand free to manipulate the drain opening and the like. Furthermore, access to the handle in the lower positions is afforded by the recess 38; and in addition, the extent of the base wall 34 affords an area for oil spillage, if such does occur, thus preventing spillage or soiling the supporting surface such as a driveway, garage floor or the like. After the fluid has drained from the drain opening, the receptacle is lowered to a lower position and removed from underneath the vehicle. The drain plug of the vehicle, etc. may be replaced when convenient. Thereafter the receptacle itself may be used as a temporary storage member or a another temporary storage container such as a plastic gallon jug or the like may be positioned in the recess 38 beneath the valve spout 22. Here again the ability of the receptacle to be vertically adjusted with respect to the support 14 enables the valve spout 22 to be positioned very close to the opening of the secondary container positioned in the recess 38. In this position the valve handle 24 may be opened to enable the oil or other fluid to drain into the gallon jug (not shown). Also the receptacle 12 entirely removed from the support 16 may be positioned on a flat surface, i.e., having a central opening to receive the boss 26 when attached thereto and a secondary container positioned beneath the spout 22.

It may thus be apparent from the above description that the device of the present invention has utility in various modes of use and with convenience not achievable by prior art devices.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A waste oil collection device comprising a receptacle having a bottom wall, upstanding side walls and a top opening, said receptacle further including a detachable cover positioned over and adapted to close said top opening, said receptacle removably positioned on a support, said support having a generally planar base, upstanding side walls and an upstanding centrally positioned post, said receptacle bottom wall including a downwardly extending boss, said boss and said post positioned in slidable telescoping relationship with each other such that the receptacle may be vertically adjusted up and down relative to said support so as to position said receptacle top opening proximal to a drain opening of a vehicle, stop means for maintaining the position of said receptacle relative to said support, said stop means operatively associated with said support such that one hand of a user may simultaneously grasp said boss and manipulate said stop means so as to both position said receptacle on said support and to remove said receptacle from said support, said support side walls including an inwardly extending recess terminating proximal to said post to facilitate easily reaching said boss by said user.

2. The device of claim 1, said support in turn forming a storage container for oil containers.

3. The device of claim 1, said stop means including a spring actuated handle positioned on said boss and adapted to be grasped by said user, said stop means further including alignment means between said post and boss for positioning said handle solely in a position wherein said handle is generally normal to said recess.

4. The device of claim 1, said receptacle having a closeable drain in the bottom wall thereof, said drain positioned above said support side wall recess whereby a disposable container such as a plastic jug may be positioned in said recess and conveniently receive oil from said receptacle.

5. The device of claim 4, said side wall recess being of triangluar shape with the apex thereof proximal said post and in addition there being an open area in said base side walls proximal said post.

6. The device of claim 1, said boss extending upwardly into said receptacle, said boss further being hollow with an open bottom such that said post may be positioned therein, said stop means including a spring actuated handle positioned on said boss and adapted to be inwardly squeeze grasped by said user.

7. The device of claim 6, said stop means including a series of aligned vertically oriented holes in said post and detent means operated by said handle adapted to extend into one of said holes to position said receptacle with respect to said support.

8. The device of claim 7, including alignment means for positioning said stop means handle generally normal to said recess, said alignment means including a vertical slot in said post and having a base wall with said holes positioned therethrough, said boss having a vertical rib extending into said slot to rotationally position said boss and said post.

* * * * *